106. COMPOSITIONS, COATING OR PLASTIC.
93

Patented Mar. 8, 1927.

1,620,091

UNITED STATES PATENT OFFICE.

FRANK H. FORD, OF HATTIESBURG, MISSISSIPPI.

INSULATION COMPOSITION.

No Drawing.  Application filed January 22, 1926. Serial No. 83,399.

This invention relates to an insulating composition and to the method of applying the same for the protection of building walls and roofs.

The primary object of the invention is the provision, in a manner as hereinafter set forth, of a composition having high insulating qualities as well as being fire-proof, and containing as its chief constituent a substance ordinarily wasted, namely, the saw dust and shavings which accumulate about saw mills and planing mills.

The insulating composition is placed between the walls and inner and outer surfaces of the roofs of buildings and may be applied to old buildings by tamping the same between the inner and outer walls or during the construction of new buildings, the composition may be applied between the studding before the inner walls are put up. This composition is particularly efficient in lumber dry kilns, where it so insulates the walls and roofs thereof as to stop condensation to a great extent thus effecting a saving in steam and improving the drying conditions of the kilns.

Although this composition is primarily intended for insulating the walls and roofs of dry kilns, it is understood that the same is not restricted to such use for it may be used wherever it is found applicable.

The improved composition consists of a body of saw dust or wood shavings or the two mixed together, in combination with a binder composed of cement, lime and an oxide such as oxide of iron, or other binding materials such as glue, silicates, such as sodium and potassium silicates, plaster of Paris or magnesia may be used with the saw dust and shavings mixture.

The composition which applicant has found to produce the best results, consists of a mixture of saw dust and shavings in the proportions of from 80 to 90% of the entire composition to from 10 to 20% of a binder and preservative mixture composed of hydrated lime, Portland cement and an oxide such as oxide of iron.

The preferred proportions of the elements in the binder and preservative mixture above set forth are approximately as follows:—

|  | Per cent |
|---|---|
| Hydrated lime | 20 |
| Cement | 75 |
| Oxide, such as iron oxide | 5 |

As above stated, this binder forms of from 10 to 20% of the complete insulating composition, the remainder being saw dust or shavings, or a mixture of saw dust and shavings.

The lime, cement and iron oxide, besides serving to stiffen or harden the composition also effectively fire-proofs the same. It has been found that in a mixture of cement and sawdust alone, or a mixture of cement and sawdust and shavings alone, or a mixture of cement and shavings alone, the cement acts upon the sawdust or shavings or both to cause the same to rot or disintegrate in time and to overcome such action, a preservative is added to the binder mixture, which preservative preferably is lime and iron oxide, as these latter act as a preservative to overcome the rottening or disintegrating of the sawdust and shavings, besides acting in connection with the cement to provide the binder.

In applying the composition the following procedure is preferably followed. The surface to which the substance is to be applied as for example, the inner surface of the sheathing of a building, between the studding and rafters thereof, is first waterproofed by the application of a layer of plastic cement, Portland cement, tar, pitch, paint or asphaltum. The composition is then applied between the studding and rafters and the inner wall then secured to the same after applying a water proofing coating to the inner surface of the packed compound. If the building operation is reversed and the inner walls are first put up before the outer sheathing is applied, the compound may be applied in the reverse order.

It is understood, of course, that sufficient water is used in mixing the composition, to make the same workable and capable of being applied to various surfaces.

The composition also possesses in the highest degree the properties of a lagging for steam heated surfaces in dry kilns and a preventive of radiation of heat.

Having thus described my invention what I claim is:—

1. An insulation composition of the character set forth comprising, a body composed of particles of ligneous material, and a binding, hardening, fireproofing and preserving medium therefor composed of cement, lime and an iron oxide.

2. An insulation composition of the character set forth comprising, a body of sawdust and shavings, and a binding, hardening, fireproofing and preserving agent therefor composed of cement, lime, and iron oxide.

3. An insulation composition of the character set forth comprising, a body of particles of ligneous material, and a binder composed of the following ingredients in approximately the following proportions, cement 75%, hydrated lime 20%, and iron oxide 5%.

4. An insulation composition consisting of approximately 10 to 20 parts of a body composed of particles of ligneous material, and one part of a binder composed of lime, cement and iron oxide.

5. An insulation composition of the character set forth comprising, from 10 to 20 parts of a body composed of particles of ligneous material and one part of a binder composed of the following ingredients in approximately the following proportions, lime 20%, cement 75% and iron oxide 5%.

In testimony whereof, I affix my signature hereto.

FRANK H. FORD.